US012737273B2

(12) United States Patent
Smith et al.

(10) Patent No.: US 12,737,273 B2
(45) Date of Patent: Sep. 15, 2026

(54) APPARATUS AND METHOD FOR GENERATING A PATH CONTAINING A USER ENGAGEMENT TARGET

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 77 days.

(21) Appl. No.: 18/819,150

(22) Filed: Aug. 29, 2024

(65) Prior Publication Data

US 2025/0225049 A1 Jul. 10, 2025

Related U.S. Application Data

(63) Continuation of application No. 18/408,121, filed on Jan. 9, 2024, now Pat. No. 12,124,352.

(51) Int. Cl.
*G06F 11/34* (2006.01)
*G06F 16/951* (2019.01)

(52) U.S. Cl.
CPC ........ *G06F 11/3438* (2013.01); *G06F 16/951* (2019.01)

(58) Field of Classification Search
CPC .......................... G06F 11/3438; G06F 16/951
See application file for complete search history.

(56) References Cited

U.S. PATENT DOCUMENTS 6,393,407 B1 5/2002 Middleton, III
10,198,524 B1 * 2/2019 Amalapurapu ....... G06F 16/958
11,301,946 B2 4/2022 Alkan
2010/0169792 A1 7/2010 Ascar
2011/0320583 A1 * 12/2011 Parker .................... H04H 60/33 709/224
2016/0180248 A1 6/2016 Regan
2020/0184529 A1 6/2020 Samarev
2021/0342040 A1 11/2021 Golan
2022/0092515 A1 3/2022 Kasabach
2022/0171823 A1 * 6/2022 Kwatra ............... G06F 16/9538
2022/0366348 A1 11/2022 Defilippo

* cited by examiner

*Primary Examiner* — Viet D Vu
(74) *Attorney, Agent, or Firm* — Caldwell LLC

(57) ABSTRACT

An apparatus and method for generating a path containing a user engagement target, the apparatus including at least a processor; and a memory communicatively connected to the processor, the memory containing instructions configuring the processor to receive user data; track a user interest over a plurality of platforms, wherein tracking the user interest includes determining an interest level of a user on a platform of the plurality of platforms; identify a plurality of distractions as function of the user interest; classify the plurality of distractions to a plurality of categories including a productive category and a non-productive category; and generate a path for the user based on the classified plurality of distractions, wherein the path includes an activity related to a productive distraction.

18 Claims, 8 Drawing Sheets

APPARATUS AND METHOD FOR GENERATING A PATH CONTAINING A USER ENGAGEMENT TARGET

CROSS-REFERENCE TO RELATED APPLICATIONS

This application is a continuation of Non-provisional application Ser. No. 18/408,121. filed on Jan. 9, 2024, now U.S. Pat. No. 12,124,352 B1, issued on Oct. 22, 2024, and entitled "APPARATUS AND METHOD FOR GENERATING A PATH USING CLASSIFIED DISTRACTIONS," the entirety of which is incorporated herein by reference.

FIELD OF THE INVENTION

The present invention generally relates to the field of data classification. In particular, the present invention is directed to an apparatus and method for generating a path containing a user engagement target.

BACKGROUND

Current methods of classifying user interests are lacking. Existing methods do not adequately account for the value of user interests that are not related to a present purpose. Additionally current methods do not allow for adequate generation of user paths.

SUMMARY OF THE DISCLOSURE

In an aspect, an apparatus for generating a path containing a user engagement target, the apparatus including at least a processor and a memory communicatively connected to the processor, the memory containing instructions configuring the processor to receive user data; track a user interest over a plurality of platforms, wherein tracking the user interest includes determining an interest level of a user on a platform of the plurality of platforms; identify a plurality of distractions as function of the user interest; classify the plurality of distractions to a plurality of categories including a productive category and a non-productive category; and generate a path for the user based on the classified plurality of distractions, wherein the path includes an activity related to a productive distraction.

In another aspect, a method for generating a path containing a user engagement target, the method including using a computing device to receive user data; track a user interest over a plurality of platforms, wherein tracking the user interest includes determining an interest level of a user on a platform of the plurality of platforms; identify a plurality of distractions as function of the user interest; classify the plurality of distractions to a plurality of categories including a productive category and a non-productive category; and generate a path for the user based on the classified plurality of distractions, wherein the path includes an activity related to a productive distraction.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating paths a user may engage in that optimize a user's interest in performing an activity. In some embodiments, a path may refer to a career choice, hobby, or the like recommend to the user based on its utility. In some embodiments, paths may be used to optimize tasks performed by a user when working, by recommending tasks that highly engage the user that is related to their work.

A path may be configured to give or help a user in finding a freedom of purpose by generating resources or outlets that optimize a user's skill set and personal/professional interests. "Freedom of purpose," as used herein, is the ability to pursue one's goals, aspirations, and sense of purpose without undue restrictions or limitations. It may include having the freedom to determine one's own path in life and to live in alignment with one's personal and/or professional values, passions, and goals. Restrictions or limitations may refer to tasks or acts of the user that do not align with their personal or professional interests or optimize a user's strength in performing personal or professional roles, tasks, objectives, and the like. Apparatuses and methods as described herein may generate paths and utility scores that help aid a user in achieving a freedom of purpose by providing a plurality of outlets or resources that algins with a user's values whether personally or professionally.

A freedom of purpose may allow a user to achieve a greater impact in one or more aspects of life. Apparatuses and methods as described herein may generate paths and provide resources curated to amplify a user's motivation, passion, clarity of goals, resilience, perseverance creativity, innovation, authenticity, and overall create a ripple effect that spreads positive change in circles the user is part of, whether it is their community, organization, or society.

Paths generated may include educational, financial, mental, and other types of tools that may aid a user in achieving a freedom of purpose. Paths generated may include professional and/or personal roles a user may take on to achieve a freedom of purpose.

Exemplary embodiments illustrating aspects of the present disclosure are described below in the context of several specific examples.

Figure 1:
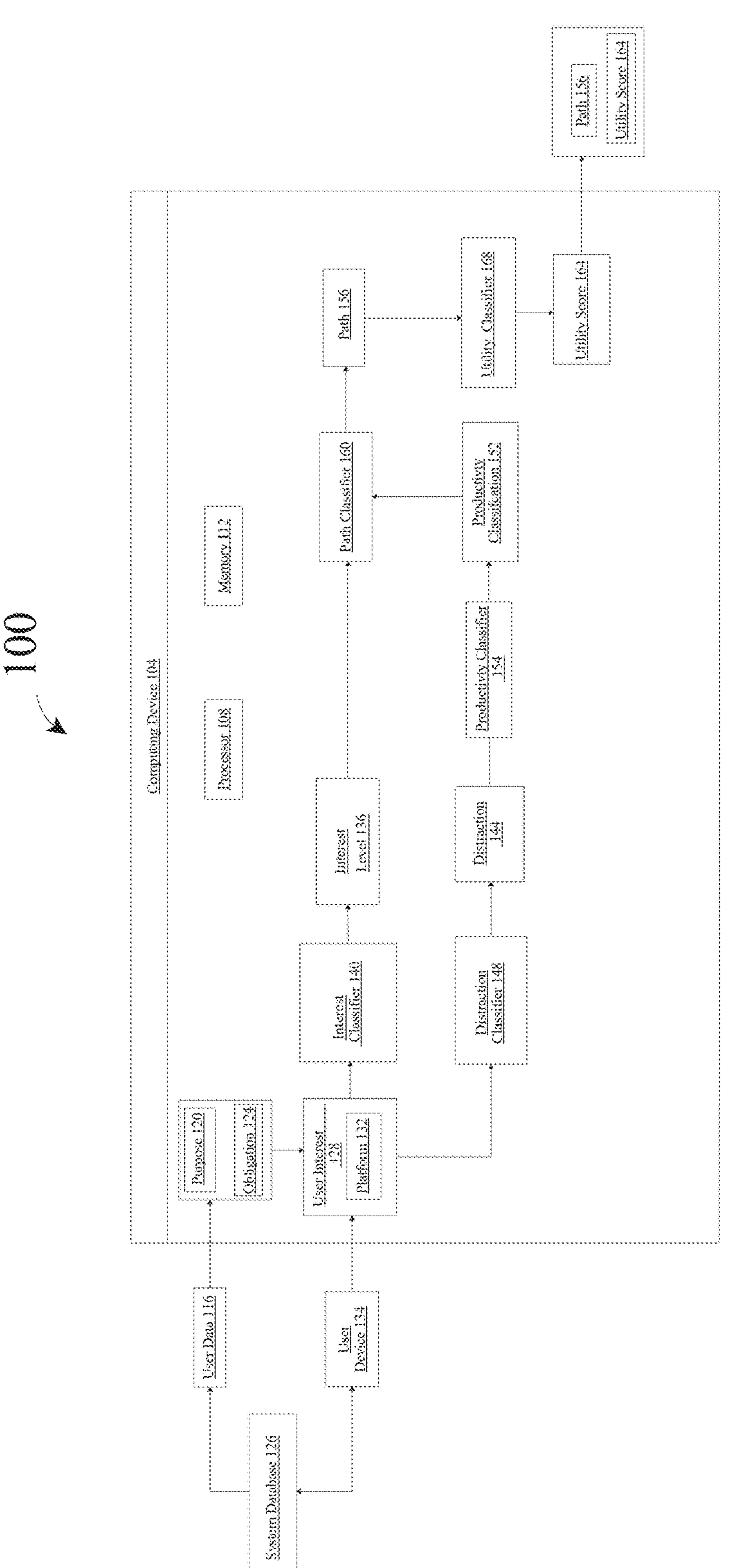
FIG. 1 is a block diagram illustrating an apparatus for generating a path.

Referring now to FIG. 1, an exemplary embodiment of an apparatus 100 for generating a path containing a user engagement target is illustrated. Apparatus 100 includes a computing device 104, containing a processor 108, and a memory 112 communicatively connected to processor 108, memory 112 containing instructions configuring processor 108 to carry out the generating process. Processor 108 may include, without limitation, any processor described in this disclosure. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive user data 116. "User data," as used herein, is information related to a user. A "user," as used herein is a person. User data 116 may relate to a purpose 120 of the user. A "purpose," as used herein, is an activity. A purpose 120 may refer to a profession, role, or hobby of significance importance and/or relevance to a user's life or daily activity. For example, a purpose 120 may be the role of a user as a doctor, entrepreneur, artist, teacher, volunteer, and the like. User data 116 may also include a user's hobbies, interests, pastimes, life goals, personality traits, mental health, physical health, and the like. User data 116 may also include identifying information of user such as a user's name, gender, geographical location, and the like. User data 116 may also include an educational history of a user including degrees, diplomas, license, certifications, names of schools and programs completed/attended and the like of a user. User data 116 may also include skill sets of the user. A "skill set," as used herein, is information describing a user's talents, attributes, and qualifications in a relation to a subject. A subject may refer to a particular or generic job role, project, hobby, career, task, performance, and the like. For example, a skillset may identify the talents and skills of a gardener, lawyer, and the like. User data 116 may include a plurality of obligations 124 related to the purpose 120 of the user. An "obligation," as used herein, is a task to be performed by a user. For example, the obligations 124 of a patent attorney may be to draft patent application, respond to office actions, research technology, and the like. An obligation 124 may be generic or specific to a purpose 120. An obligation 124 may also include information describing what is expected of a user in relation to purpose 120. For example, an obligation 124 may be that an attorney is expected to bill 160 hours a month, deliver work product in a set time frame, and the like.

Still referring to FIG. 1, user data 116 may be received through a system database 126 communicatively connected to computing device 104. A "system database," as used herein, is a data structure containing information to be used in generating a path. Databases, as disclosed throughout this disclosure, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, user data 116 may be received and include information as disclosed in U.S. Non-provisional application Ser. No. 18/402,361, filed on Jan. 2, 2024 and entitled "AN APPARATUS AND METHOD FOR GENERATING A SOLUTION," the entirety of which is incorporated herein by reference.

Still referring to FIG. 1, computing device 104 is configured to track a user interest 128 over a plurality of platforms 132, wherein tracking the user interest 128 includes determining an interest level 136 of a user on a platform 132 of the plurality of platforms 132. "User interest," as used herein, is a user's activity on a user device. User interest may be referred to as user engagement within this disclosure. A "platform," as used herein, is the domain of user activity on a user device. The domain, for example, may refer to a particular user device 134 application, online website, web portal and the like. User interest 128 may include a list of applications accessed and interacted with by a user on a user device 134. A "user device," as used herein, is a computing device operated by user. A user device 134 may be a computing device, such as a laptop, tablet, smart phone, and the like. For example, user interest 128 may refer to a user opening a word document application on their work provided laptop. Tracking user interest 128 may include tracking the type of content a user interacts with, the length of time spent with each interaction, and the like. For example, computing device 104 may track the type of videos a user watches or shares on a video sharing platform 132, as well as track details about the engagement such as if the volume of the video were muted or if other tabs in a web browser were opened, and the like.

Still referring to FIG. 1, in some embodiments, tracking user interest 128 may include receiving system logs from the user device 134. A "system log," as used herein, is a chronological record of activities within a computer system and network. For example, the system log may track various events, including user activities like mouse movements, keystrokes, application usage, file access, network connections, and program execution. Additionally, a system log may include error messages, warnings, informational events, timestamps, event identifiers, and relevant details about the events or actions that occurred. The system log may be received from the operating system, such as Windows, macOS, or Linux, of the user device 134.

Still referring to FIG. 1, in some embodiments tracking user interest 128 may include a plurality of mouse tracking methods. Mouse tracking may include cursor tracking, wherein software is used to track a cursor position on user device 124. Cursor tracking may provide a variety of data such as the location of the cursor (in terms of pixels), time stamps, any time the mouse hovers on a link of interest, mouse clicks, time spent in areas of interest, and duration of hovers. In some embodiments, computing device may identify element of a webpage that a mouse hovers over, click on, or the like, as an interest of a user. In some embodiments, mouse tracking may be implemented using JAVASCRIPT. In some embodiments, a cursor may not be limited to a cursor of a computer mouse but can be a cursor used by other input methods such as joysticks, trackpads, TRACKPOINT, pointing stick, touch screen, or the like. Mouse tracking may include inertial tracking, wherein computing device 104 receives detected mouse movement of user device 134 by sensors such a accelerometers and gyroscopes, located in the mouse, wherein the sensors measure changes in velocity and direction, allowing computer device 104 to calculate the mouse's position. Mouse tracking may include electromagnetic tracking using a special mouse pad or surface that emits a low-frequency electromagnetic field, wherein the mouse of user device 134 contains sensors that detect the changes in the field as it moves across the surface, and computing device 104 receives the detected movement. Mouse tracking may include capacitive tracking utilizing the principles of capacitance to detect the position of the mouse, wherein the mouse of user device 134 contains electrodes that create an electrical field, and when the user's hand or finger touches the mouse's surface, the capacitance changes. Computing device 104 may receive such detections to measure the changes in capacitance and determine the position of the mouth.

Still referring to FIG. 1, in some embodiments, tracking user interest 128 may include browser fingerprinting. "Browser fingerprinting," as used herein is a technique used to identify and track individual web browsers based on their unique characteristics. For example, computing device 104 may collect information about a user's device, browser configuration, and behavior to create a digital fingerprint that can be used to recognize and distinguish one user from another on user device 134. Browser fingerprinting may include a user agent string, which is a piece of information transmitted to the browser to identify itself. It includes details such as the browser name, version, operating system, and device type. Different browsers and user devices have unique User agent strings. Browser fingerprinting may include an IP address which is a unique identifier assigned to a device connected to the internet. It can be used to geolocate and identify the general location of the user. Browser fingerprinting may include HTTP Headers. Various HTTP headers exchanged between the browser and web server of user device 134 which may provide additional information. Examples include the Accept-Language header, which indicates the user's preferred language, and the Referrer header, which shows the URL of the page that linked to the current page. Browser fingerprinting may include a browser time zone and language. The browser's time zone setting and preferred language settings may contribute to the fingerprint. Different combinations of time zone and language preferences may help identify users uniquely. Browser fingerprinting may include browser features, such as information about the user device 134 browser's installed plugins, fonts, screen resolution, and color depth can be collected. Browser fingerprinting may include JavaScript-based measurements, wherein a JavaScript code running in the browser can gather additional information, such as the user device's fonts, audio and video capabilities, installed plugins, and even mouse movements. Computing device 104 may combine the methods may use generate a unique identifier for a browser.

Still referring to FIG. 1, in some embodiments, tracking user interest 128 may include cross-device tracking. "Cross-device tracking," as used herein, is a method used to link and track a user's activities and behavior across multiple user devices. Cross-device tracking may include identifying unique identifiers associated with each user device of the user and then linking them together. These identifiers can include user login information, browser fingerprint, email address, phone number, IP address matches, and the like. In some embodiments, tracking user interest 128 may include tracking user device 134 cookies. "Tracking cookies," as used herein, are small text files that are placed on a user's device when they visit a website. These cookies are created by a domain (website) that is different from the one the user is currently visiting. Computing device 104 may use tracking cookies to track and collect information about the user's browsing behavior across multiple websites.

Still referring to FIG. 1, in some embodiments, computing device 104 may utilize a network monitoring software to collect data on the activities happening between a plurality of computers and the user device 134. This may include tracking websites visited, data transferred, and communications made. Monitoring may be conducted at various levels, including the network perimeter, individual devices, or through the use of proxy servers. For example, a network monitoring software may capture and analyze network packets, which are the units of data transmitted over a network. By inspecting the packets, computing device 104 may identify the websites being accessed by a user by analyzing the destination IP addresses or domain names. In some embodiments, tracking user interest 128 may include receiving the web browser history of a user device 134. Web browsers maintain a history of visited websites, which may be accessed by computing device. This history may reveal the websites a user has visited, including search queries, and browsing patterns.

Still referring to FIG. 1, in some embodiments, tracking user interest 128 may include determining an idle time. A "idle time," as used herein, is a duration of time that a user spends on a platform 132. The idle time may refer to the duration of time spent on a platform 132 before a user navigates away or performs miscellaneous actions. For example, if a user is supposed to be watching an online seminar on tax law, computing device 104 may track the user opening another tab and engaging in a chat forum for fixing cars. A long idle time may indicate that the user finds the content valuable or engaging. A short idle time may indicate that the user is not engaged or disinterested. In some embodiments, tracking user interest 128 may include determining a bounce rate. A "bounce rate," as used herein, is a metric indicating the number of platforms 132 accessed by user then left without any engagement. For example, a user may open a word document or webpage and not interact with the application by typing words, clicking on widgets, and the like before exiting the application.

Still referring to FIG. 1, in some embodiments, tracking user interest 128 may include determining a conversion rate. A "conversion rate," as used herein is a metric indicating the number of platforms 132 accessed by a user wherein a specific action was completed. A specific action may relate to a purpose 120 or obligation 124 of the user. For example, a specific action on a webpage may be for a user to upload and submit work product. Computing device 104 may track the submission of work product through the webpage. Computing device 104 may determine the idle time, bounce rate, and conversion rate using computational algorithms as described in this disclosure. For example, an idle time may be calculated by recording a timestamp when a user accesses a webpage and then comparing it to a timestamp when the user navigates away from that page or takes another action on the website. Additionally, computing device 104 may determine idle time, bounce rate, and conversion rate using analytical software such as Google Analytics, Adobe Analytics, and the like.

Still referring to FIG. 1, computing device 104 is configured to generate an interest level 136. An "interest level," as used herein, is a metric indicating a level of involvement with a platform. Interest level 136 may be represented as numerical or linguistic score. For example, interest level 136 may be a percentage wherein a high percentage may indicate a high level of involvement and low percentage indicates a low level of involvement. The interest level 136 may be linguistic score generated using fuzzy sets as described further below. For example, the interest level 136 may be labels such as "fully engaged," "disinterested," "high," "low," "average," and the like. Computing device 104 may use a machine-learning process, and/or a computational algorithm as described throughout this disclosure to generate an interest level 136. Algorithms may include linear regression, logistic regression, decision trees, and neural networks. For example, a regression model may be trained with a dataset including numerical scores with corresponding tracking metrics and factors, such as dwell, keystrokes, and the like. In another example, determining an interest level may include using an interest classifier 140 configured to reference the plurality of tracking metrics and output the interest level 136. The interest classifier 140 training data set may include data correlating elements of user data and tracking metrics to a plurality of interest levels. A "classifier, " as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. The use of machine-learning models may provide improvement to computing device 104 by enabling the ability to compare and sort a plurality of data into categories that allow processor 108 to accurately/optimally perform analytical tasks such as generating a path based on the categorization of data as derived throughout this disclosure. For example, a machine-learning model, such as interest classifier 140, improves the performance power of processor 108 by generating a plurality of interest levels for each platform, wherein each interest level provides a linguistic score by analyzing the plurality of tracking metrics received by computing device 104. The quantity of data that goes into generating the interest level may vary and fluctuate based on a plurality of variables, such as the quantity of platforms visited by a user, the implementation of tracking metrics, and the like. Without the implementation of a machine-learning model, there would be a trade in the performance power of 108, such as time and accuracy, in order to sort the data and generate interest levels that are then used in a separate classification process, as described further below, in order to generate a path that correlates to a user's interest. The ability to continuously train a machine-learning model cable of learning to identify new trends or correlations within a fluctuating quantity of data is a benefit that would not be realized otherwise, without the tradeoff in performance efficiency.

Still referring to FIG. 1, computing device 104 and/or another device may generate a classifier using a classification algorithm, defined as a processes whereby a computing device 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, generating interest level 136 may include generating a score, such as an assessment score for the idle time, conversion rates, bounce rate and other factors of tracking metrics for user interest 128 as described above, wherein the scores may be aggregated and/or individually compared to an interest threshold to output the interest level 136. An "assessment score," as used herein, is a score generated for an individual method of tracking user interest in relation to user involvement with a platform. The assessment score may refer to a quantity or variance of a tracking method, such as high and or consistent idle time. The "interest threshold," as used herein, is a value used to make a decision based on a generated score. The interest threshold may be a single or a set of linguistic or numerical values set as the standard for determining an interest level 136 based on the aggregation of a plurality of tracking metrics and factors as described above. A "linguistic variable," as used herein, is a variable whose values are not numbers, but words or sentences in a natural language. In an example, the interest threshold may be that an idle time, keystroke rate, conversion rate must score 70% or higher in relation to user involvement with a platform 132 to be identified as high interest level 136. In some embodiments, the interest threshed may be tailored to the purpose 120 or obligations 124 of user. For example, interest threshold for an obligation 124 for photoshopping an image may be different from an interest threshold for an obligation 124 of writing a report. Computing device 104 may retrieve an interest threshold from system database 126.

Still referring to FIG. 1, in some embodiments, a plurality of assessment scores may be compared to the interest threshold using an inference engine as described further below. Wherein the assessment score is a linguistic variable, the interest threshold may be linguistics as well. For example, the interest threshold may be that the idle time and conversion rate must be "high" to correlate the user interest 128 to a high level of user interest 128. In some embodiments, computing device 104 may use an inference engine to compare a linguistic assessment score to a linguistic interest threshold. For example, using a fuzzy set inference system, an idle time related to user interest 128 fuzzy set may be compared to an idle time related interest threshold fuzzy set, wherein the interest level 136 may be a linguistic variables as described above.

In some embodiments, computing device 104 may determine an interest level 136 for a plurality of platforms 132 related to obligations 124 of a purpose 120 of the user, wherein each interest level 136 generated is aggregated and compared to an overall interest threshold to generate an overall assessment score. These overall metrics may be generated using methods as described above for assessment score and interest level 136, wherein the quantity of platforms 132 is taken into consideration as a factor. For example, in a fuzzy set inference system, an overall interest threshold fuzzy set may be used, wherein the fuzzy set includes factors such as overall expected idle time based on the average of platforms 132 engaged with and the like.

Still referring to FIG. 1, computing device 104 is configured to identify a plurality of distractions 144 as a function of the user interest 128. In some embodiments, determining a distraction 144 may be based on the interest level 136, type of platforms 132 accessed, the content of user interest 128, and the like. A "distraction," as used herein, is activity on a user device that is not related to an obligation. A distraction 144 may be miscellaneous activities performed by the user before, during, or after performing their obligations 124. For example, a user may leave a word document application to open a web browser to watch a gardening video. The activity of engaging with a gardening video may be labeled as a distraction 144. Computing device 104 may identify a distraction 144 based on user interest 128 with a platform 132 that does not correspond with the obligations 124 received from user data 116 or other elements of user data 116 that relate to a user's purpose 120. Comparisons may be performed using computational algorithms as described in this disclosure. For example, computing device 104 may classify user interest 128 data to one or more user interest categories. A "user interest category," as used herein is classification of a user interest based on content. Content may refer to type of platform, such as computer application or software like word document or photoshop. Content may refer to the subject of the platform, for example, web articles about tax law. For example, user interest categories may include software, application, video, photo, research, education, leisure, and the like. Computing device may use an interest category classifier configured to receive user interest 128 data and output a user interest category. The training data set may include user interest data correlated to a plurality of user interest categories. Training data may also include a plurality of obligations and purposes correlated to user interest categories. In some embodiments, classifying user interest 128 data may include using an inference engine applying IF-THEN logic as described further below. For example, "if user interest data includes a video platform with the content subject of home repair than user interest data below to the education and video user interest categories." Additionally, computing device 104 may use a distraction classifier 148 configured to receive a plurality of platforms 132 and/or the subject matter of user interest 128 on the plurality platforms 132 as an input and output a distraction 144. A distraction training data set may include a plurality user interest categories of user interest data correlated to the plurality of user interest categories of obligations and purposes, wherein a user interest category of user interest data that does not match an obligation/purpose user interest category is classified is labeled as a distraction. The distraction training data set may also include a plurality of platforms of user interest/subject matter correlated to a plurality of platforms/subject matter related to obligations and purposes of a user. The distraction training data set may be received from system database 126.

Still referring to FIG. 1, computing device 104 is configured to classify the plurality of distractions 144. Computing device 104 may classify distractions 144 by categorizing the distractions 144 to a productivity classification 152. A "productivity classification," as used herein, is a classification of a distraction 144 based on productive effect the activity has on a user. A productivity classification 152 may include a productive category and non-productive category. Productivity may refer to activities that expand a user's knowledge, interest skill set, purpose 120, and the like. For example, chatting on a forum about fixing cars may be classified as a productive distraction 144 because the user is expanding their knowledge in a particular hobby/interest, unlike a user playing cat videos which may be classified as non-productive for being more of a leisure based activity. Computing device 104 may classify the distractions 144 using a productivity classifier 154. In some embodiments, classifying the plurality of distractions 144 may include receiving a productivity training data set, received from system database 126, including data correlating a plurality of distractions 144 to a productivity classification 152, training the productivity classifier 154 using the productivity training data set, and outputting, using the productivity classifier 154, a productivity classification 152. Productivity classifier 154 may be trained to identify productive and non-productive elements in a distraction by populating the distraction training data set with samples of productive and non-productive activity, this may also be based on the user interest category as described above. For example, samples may be received by a user, third-party, or web crawler. A web-crawler may be configured to scrap and index data from platforms related to user interest 128 to determine a user interest category of the platform content. For example, user interest categories related to research and education may be labeled as productive, wherein categories related to videos and leisure may be labeled as non-productive. In some embodiments, computing device 104 may train productivity classifier 154 with a specific training data set related to a specific obligation 124 or purpose 120 of a user. For example, when classifying a plurality of distractions 144, wherein purpose 120 of a user is a writer, the training data set may specifically include data correlating a plurality of distractions to a productivity classification in relation to a writer. Specific/purpose-based training data sets may be received from system database 126 and using other methods as described above.

Still referring to FIG. 1, computing device 104 is configured to generate a path 156 for the user based on the classified plurality of distractions 144. A "path," as used herein, is an information describing an activity to be recommended to a user. A path 156 may refer to a career, hobby, activity, and the like, that incorporates data received from productive distractions 144. For example, computing device 104 may generate a path 156 that a user should pivot from a career in accounting to a mechanics. A path 156 may refer to an activity a user will better spend their time doing in fulfilling/achieving a purpose 120 in their work, hobbies, or interests. A path 156 may include a task or goal for the user. For example, a goal could be for a user to join an auto body club to further their skills and education in the field. In some embodiments, generating a path 156 may be based on the interest level 136. For example, a path 156 related to volunteering at an animal shelter may be based on a high interest level 136 of a user on video platforms 132 related to nursing stray cats. Computing device 104 may generate a path 156 using a that path classifier 160 configured to receive a productive distraction 144 and output one or more paths 156. A path 156 training data set may include elements of user data 116 and platform 132 interest levels 136 correlated to a plurality of paths 156. In some embodiments, paths 156 may be received from system database 126, wherein the system database 126 may be populated with paths 156 received from a web crawler. A "web crawler," as used herein, is a program that systematically browses the internet for the purpose 120 of web indexing. The web crawler may be seeded with platform 132 URLs, wherein the crawler may then visit the next related URL, retrieve the content, index the content, and/or measures the relevance of the content to the topic of interest. In some embodiments, computing device 104 may generate a web crawler to scrape a plurality of paths 156 from a plurality of social media sites, blogs, forums, platform 132, and the like. The web crawler may be seeded and/or trained with a reputable website to begin the search, such as platforms 132 engaged in by user. A web crawler may be generated by computing device 104. In some embodiments, the web crawler may be trained with information received from a user through a user interface. In some embodiments, the web crawler may be configured to generate a web query. A web query may include search criteria received from a user. For example, a user or computing device 104 may submit a plurality of platforms 132 and elements of user data 116 for the web crawler to search based on. In another embodiment, a path 156, for look up and classification purposes, may be generated using a machine-learning model. For example, a path 156 machine-learning model may be configured to receive general user data 116 and output compatible paths 156. Training data may include a plurality of user data 116 elements correlated to a plurality of platforms 132, tasks, activities, and the like. For example, user data 116 describing a user to be introverted and curious may be correlated to platforms 132 and tasks that involve online books clubs, web seminars, and the like. Paths 156 output by the machine-learning model may be stored in system database 126.

Still referring to FIG. 1, generating a path 156 may additionally include generating a plurality of paths 156, generating a utility score 164 for each path 156 of the plurality of paths 156, and ranking the plurality of paths 156 based on the utility score 164. A "utility score," as used herein is a metric indicating a level of usefulness. Usefulness may refer the practicality, pecuniary value, productivity, and/or impact on a user. For example, paths 156 related to a career change may be ranked using the utility scores 164, wherein the utility score 164 is based on a financial value of each path 156. In another example, paths 156 related to expanding on a user's hobby may be ranked using the utility scores 164, wherein the scores are based on the likelihood of a user interest 128 in the selected path 156. The utility score 164 may be numerical on linguistics, similar to the interest level 136 as described above. The utility score 164 may be generated based a on utility threshold using methods as described above, similar to the interest threshold. In some embodiments, the utility score 164 may be generated using a utility classifier 168, wherein the utility classifier 168 is configured to receive a path 156 and output a utility score 164. A utility training dataset may include data correlating a path to a utility score. Utility score 164 classifications may be received from system database 126. For example a utility score 164 based on a path 156 usefulness in growing a user's financial value, may be received from training data set in system database 126 correcting finance based paths 156 to a plurality of scores. In some embodiments, the utility training data set may include elements of user data 116 and a path 156 correlated to a utility score 164.

Still referring to FIG. 1, computing device 104 may transmit and display the ranked plurality of paths 156 to the user through their user device 134 or by electronic communication, such as email, text, and the like. In some embodiments, computing device 104 may use a chatbot to receive user feedback back on the paths 156 provided, the ranking, and the like. Computing device 104 may receive user feedback through the system database 126, and the like. In the case of dissatisfaction with paths 156 or rankings by the user, computing device 104 may request and receive amendments or suggestions from the user regarding paths 156 and/or ranking through the chatbot. Computing device 104 may incorporate the user feedback, including the amendments and suggestions, in any machine-learning process or computational algorithm uses to generate a path 156 as described above, and reproduce and display an updated path 156 (*s*) and/or ranking. For example, user feedback may be used to retrain path classifier 160. Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, computing device 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; computing device 104 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Additionally, computing device 104 may track a user's progress with a path 156 using methods as disclosed in U.S. Non-provisional application Ser. No. 18/402,361.

Figure 2:
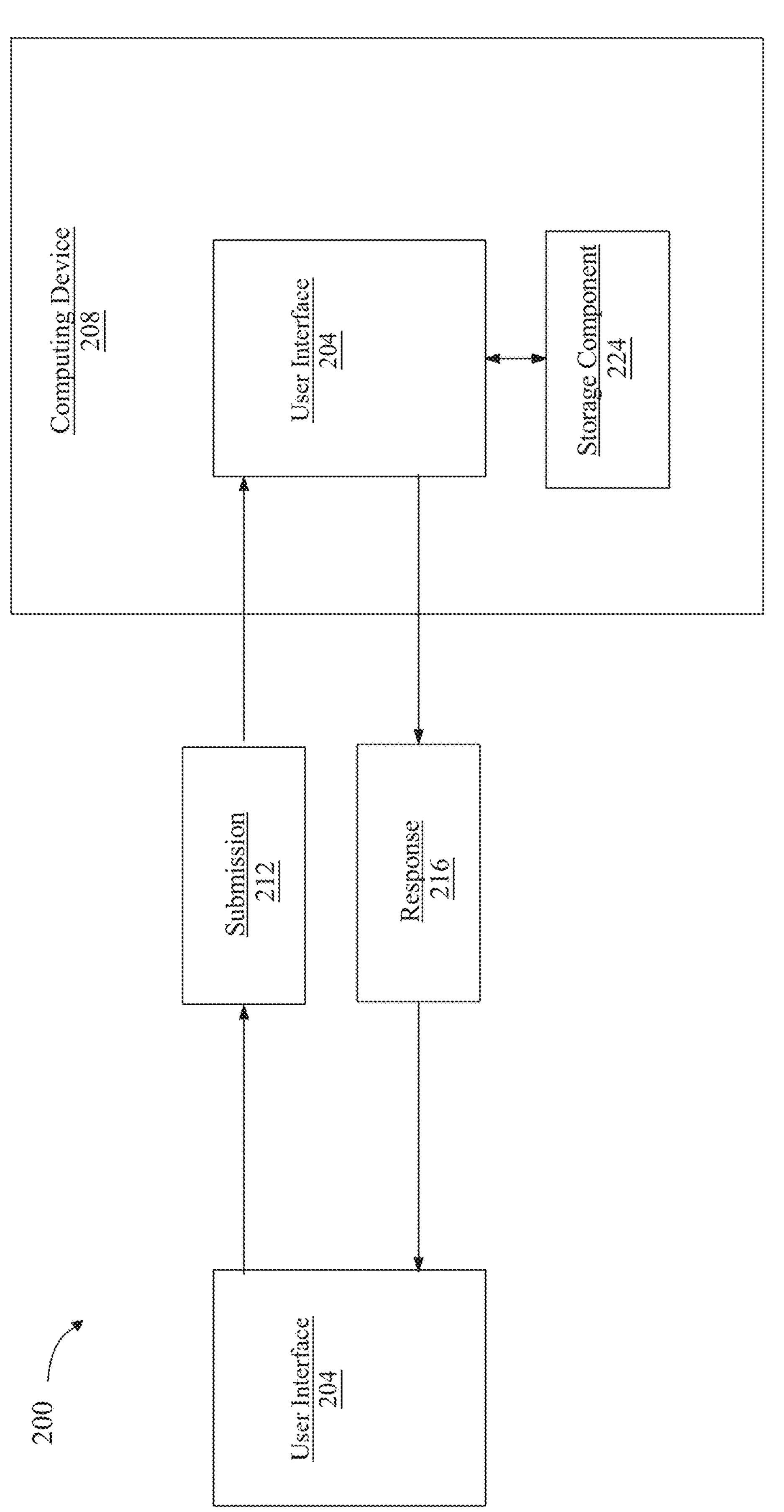
FIG. 2 is a block diagram illustrating a chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 104 as an input to another function, for example without limitation at least a feature 108 or at least a preference input 112.

Figure 3:
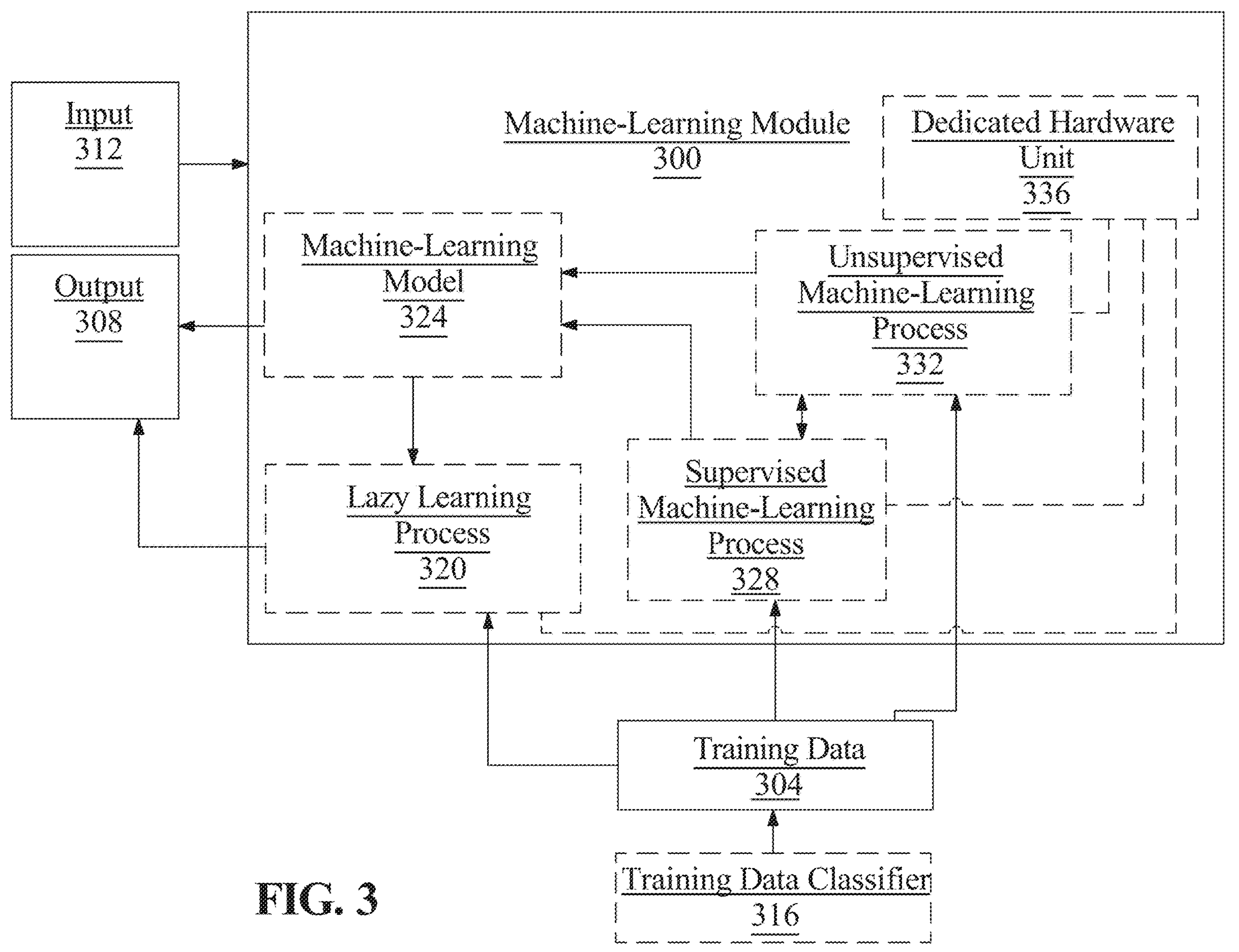
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, data correlating elements of user data and tracking metrics to a plurality of interest levels.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to purpose categories, wherein certain sets of training data are curated for correlations of user data based on a professional role, such as a writer, lawyer, doctor, hobby, skill, and the like. These subs-sets of training data improve the function of processor 108 by optimizing categorization of user data to an output such as an interest level or productivity category as described above in generation of a path 156 and utility score 164.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down sampling on data. Down sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as “desired” results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
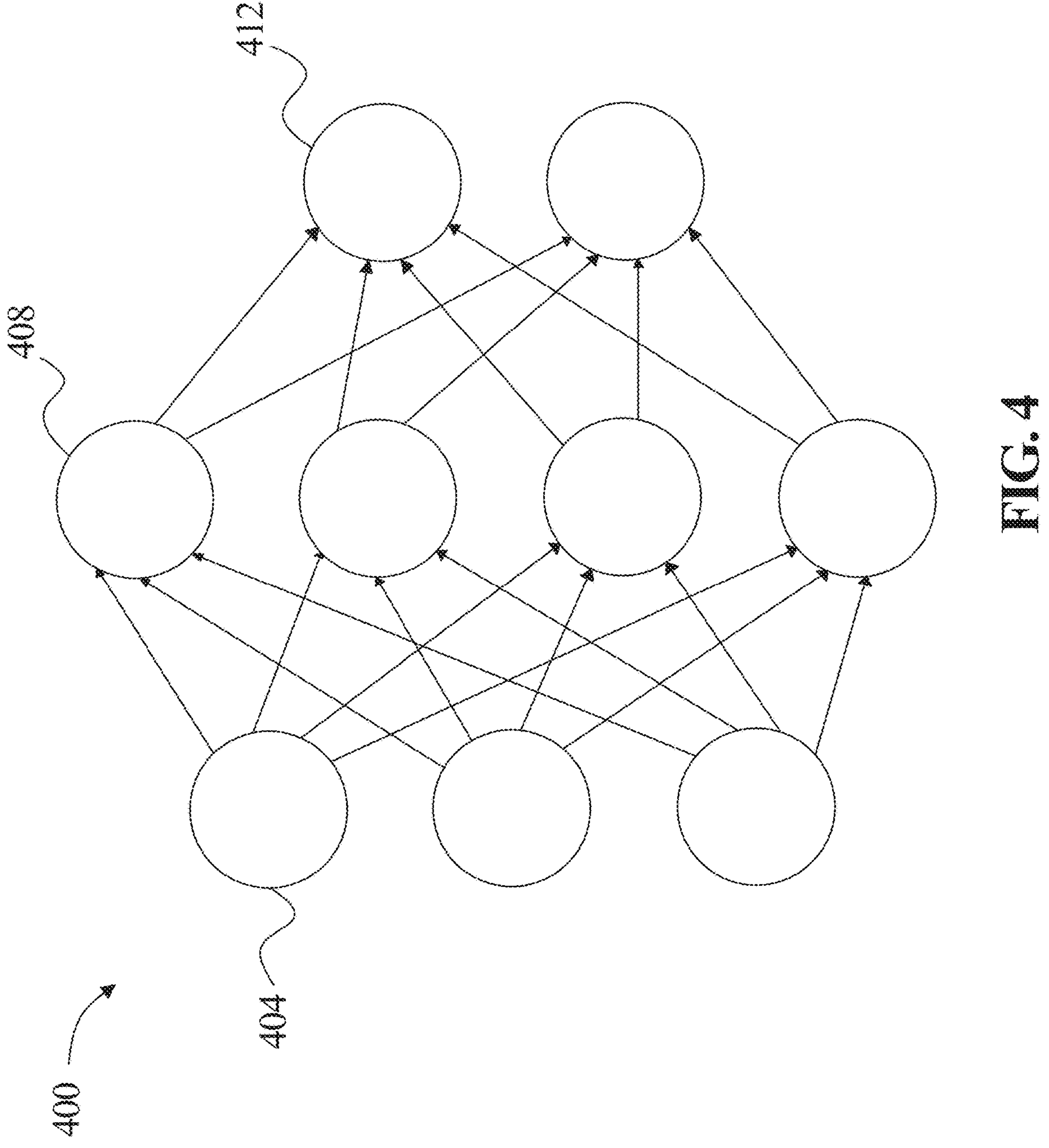
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
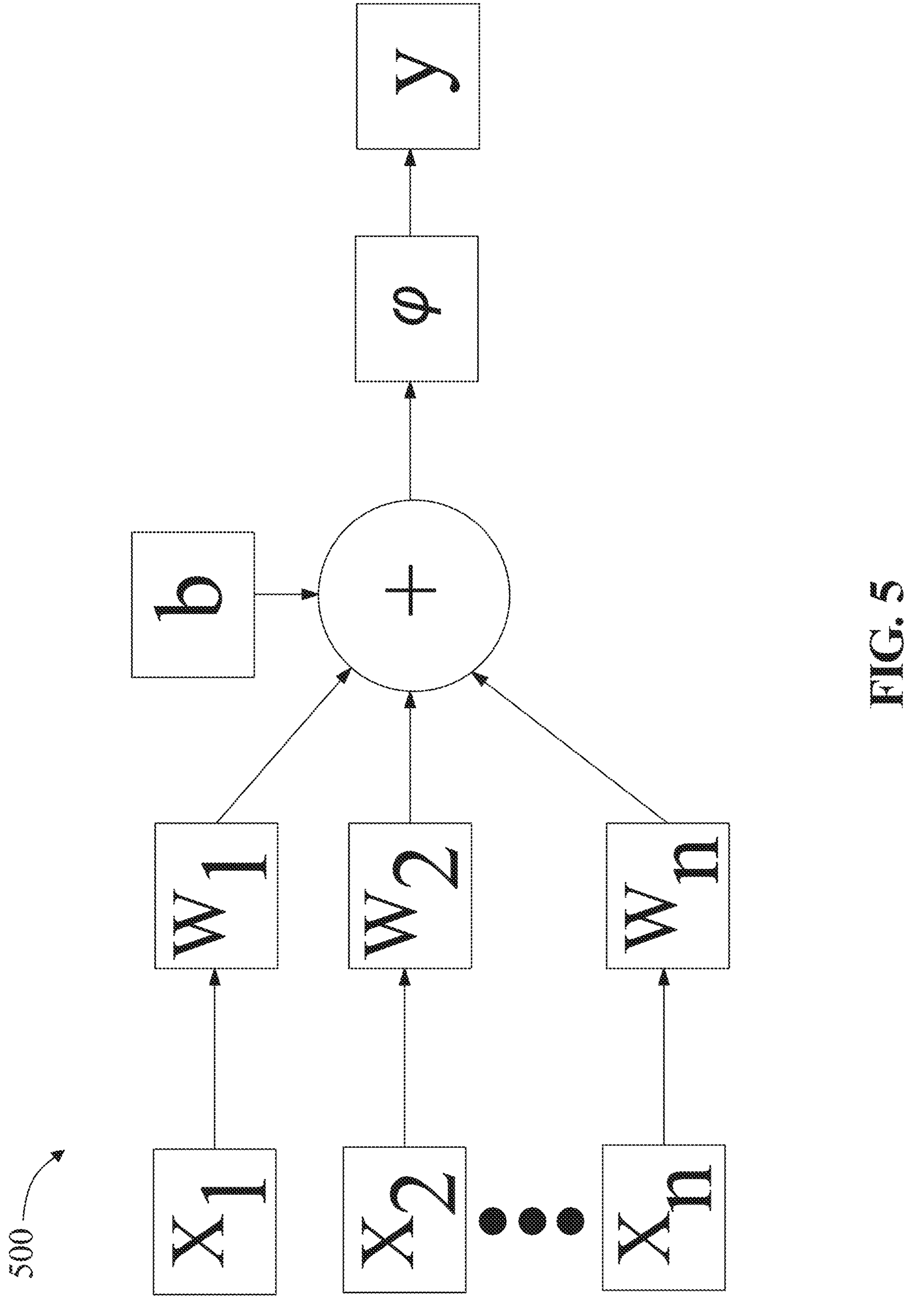
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
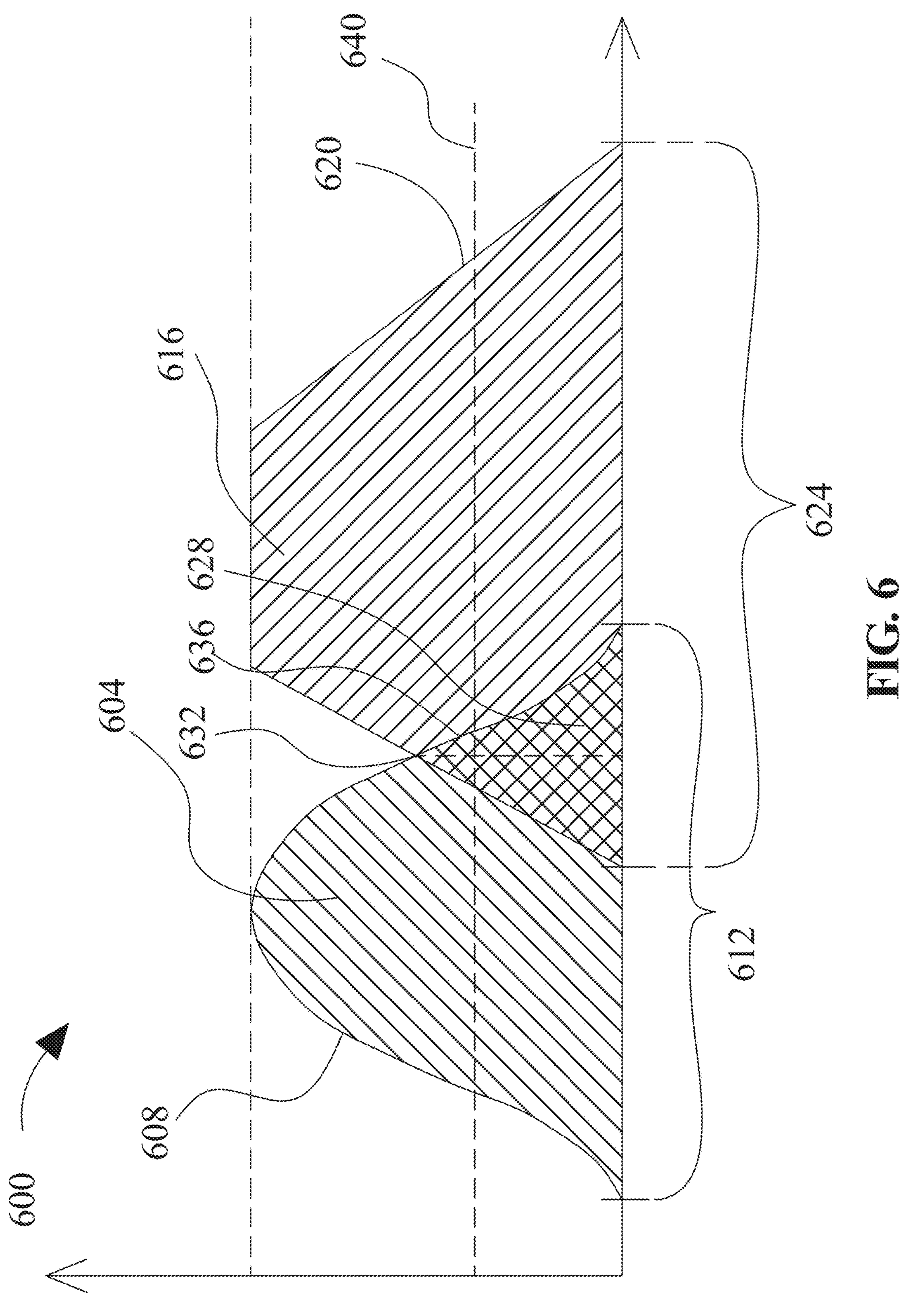
FIG. 6 is a diagram of fuzzy set comparison.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, user interest metric, and a predetermined class, such as without limitation of interest threshold metrics. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or user interest metric and a predetermined class, such as without limitation interest threshold metric categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a user interest metric with interest threshold metric. For instance, if an interest threshold metric has a fuzzy set matching user interest metric fuzzy set by having a degree of overlap exceeding a threshold, computing device 104 may classify the user interest metric as belonging to the interest threshold metric categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a user interest metric may be compared to multiple interest threshold metric categorization fuzzy sets. For instance, an idle time user interest metric may be represented by a fuzzy set that is compared to each of the multiple interest threshold metric categorization fuzzy sets; and a degree of overlap exceeding a threshold between the user interest metric fuzzy set and any of the multiple interest threshold metric categorization fuzzy sets may cause computing device 104 to classify the user interest metric as belonging to interest threshold metric categorization. For instance, in one embodiment there may be two interest threshold metric categorization fuzzy sets, representing respectively a first idle time interest threshold metric categorization and a second bounce rate interest threshold metric categorization. First interest threshold metric categorization may have a first fuzzy set; Second interest threshold metric categorization may have a second fuzzy set; and user interest metric may have a user interest metric fuzzy set. Computing device 104, for example, may compare a user interest metric fuzzy set with each of interest threshold metric categorization fuzzy set and in interest threshold metric categorization fuzzy set, as described above, and classify a user interest metric to either, both, or neither of interest threshold metric categorization nor in interest threshold metric categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, user interest metric may be used indirectly to determine a fuzzy set, as user interest metric fuzzy set may be derived from outputs of one or more machine-learning models that take the user interest metric directly or indirectly as inputs.

Still referring to FIG. 6, a computing device may use a logic comparison program, such as, but not limited to, a fuzzy logic model to determine an interest level. An interest level may include, but is not limited to, "fully engaged," "disinterested," "high," "low," "average," and the like; each such interest level may be represented as a value for a linguistic variable representing interest level or in other words a fuzzy set as described above that corresponds to a degree of a level of involvement with a platform as calculated using any statistical, machine-learning, or other method that may occur to a person skilled in the art upon reviewing the entirety of this disclosure. In other words, a given element of user interest metric may have a first non-zero value for membership in a first linguistic variable value such as "engaged" and a second non-zero value for membership in a second linguistic variable value such as "disinterested" In some embodiments, determining an interest threshold metric categorization may include using a linear regression model. A linear regression model may include a machine learning model. A linear regression model may be configured to map data of user interest metric, such as degree of involvement to one or more interest threshold metric parameters. A linear regression model may be trained using a machine learning process. A linear regression model may map statistics such as, but not limited to, quality of user interest metric. In some embodiments, determining an interest threshold metric of user interest metric may include using an interest threshold metric classification model. An interest threshold metric classification model may be configured to input collected data and cluster data to a centroid based on, but not limited to, frequency of appearance, linguistic indicators of quality, and the like. Centroids may include scores assigned to them such that quality of interest of user interest metric may each be assigned a score. In some embodiments interest threshold metric classification model may include a K-means clustering model. In some embodiments, interest threshold metric classification model may include a particle swarm optimization model. In some embodiments, determining the interest threshold metric of a user interest metric may include using a fuzzy inference engine. A fuzzy inference engine may be configured to map one or more user interest metric data elements using fuzzy logic. In some embodiments, user interest metric may be arranged by a logic comparison program into interest threshold metric arrangement. An "interest threshold metric arrangement" as used in this disclosure is any grouping of objects and/or data based on skill level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given high interest level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to user interest metric, such as a degree of interest of an element, while a second membership function may indicate a degree of in disinterest of a subject thereof, or another measurable value pertaining to user interest metric. Continuing the example, an output linguistic variable may represent, without limitation, a score value. An inference engine may combine rules, such as: "if the idle time is 'high and the bounce rate is 'low, the interest is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b(a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
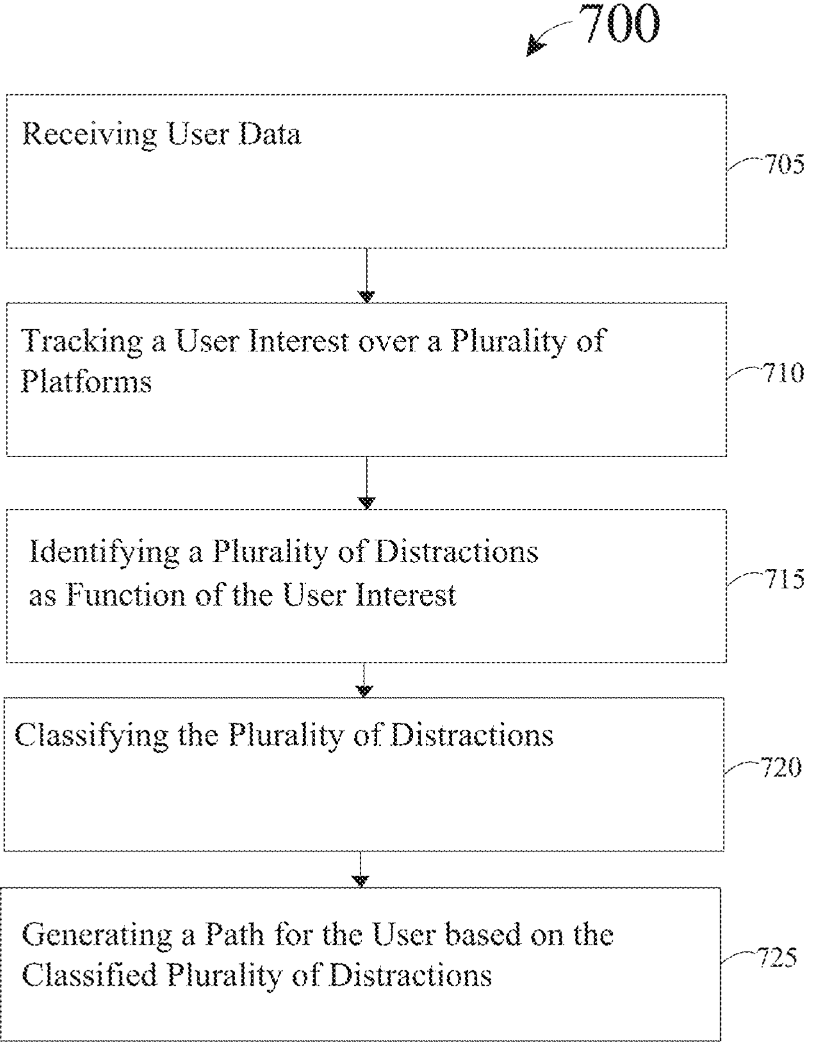
FIG. 7 is a flow diagram illustrating a method of generating a path.

Referring now to FIG. 7, a flow diagram illustrating a method 700 of generating a path containing a user engagement target is illustrated. At step 705, method 700 includes receiving, by a computing device, user data, the user data may include a purpose of the user. The user data may include a plurality of obligations related to the purpose of the user. At step 710, method 700 includes tracking, by the computing device, a user interest over a plurality of platforms, wherein tracking the user interest includes determining an interest level of a user on a platform of the plurality of platforms. Tracking the user interest may include receiving system logs from a user device. The plurality of platforms may include at a least a website. Determining the interest level of the user further may include determining an idle time of a user on a platform. At step 715, method 700 includes identifying, by the computing device, a plurality of distractions as function of the user interest. At step 720, method 700 includes classifying, by the computing device, the plurality of distractions. Classifying the plurality of distractions may include a productivity classification. Classifying the plurality of distractions further may include receiving a productivity training data set including data correlating a plurality of distractions to a productivity classification; training a productivity classifier using the distraction training data set; and outputting, using the distraction classifier, a productivity classification. The productivity classification may include a productive category and a non-productive category. At step 725, method 700 includes generating, by the computing device, a path for the user based on the classified plurality of distractions. Generating the path for the user may include generating a plurality of paths; generating a utility score for each path of the plurality of paths; and ranking the plurality of paths based on the utility score.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
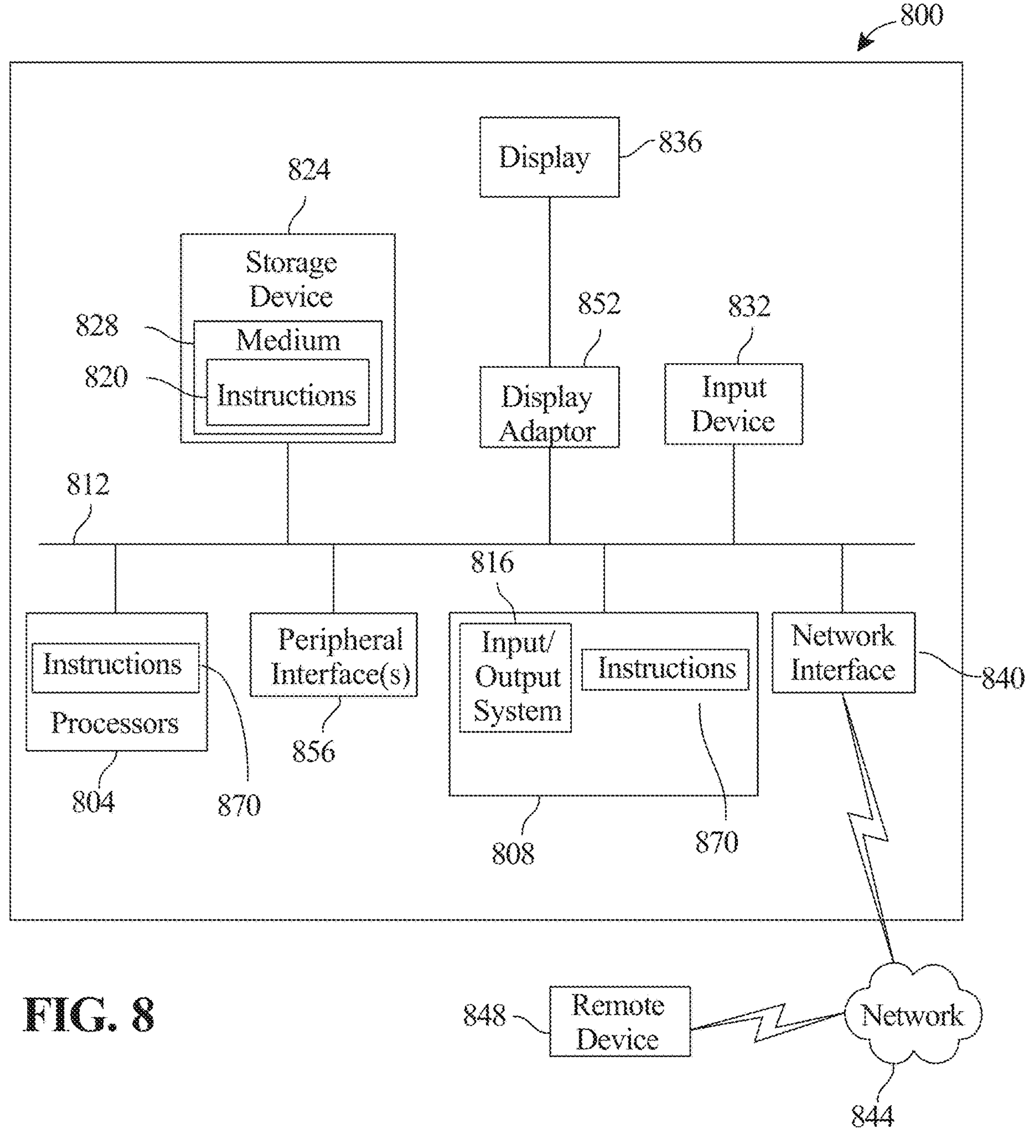
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating a path containing a user engagement target, the apparatus comprising:

at least a processor; and a memory communicatively connected to the at least a processor, the memory containing instructions configuring the at least a processor to:

receive user data identifying a purpose of a user;

track a user interest over a plurality of platforms, wherein tracking the user interest comprises determining an interest level of a user on a platform of the plurality of platforms, wherein the interest level comprises an assessment score compared to an interest threshold using an inference engine;

identify a plurality of distractions based on the user interest;

classify the plurality of distractions to a plurality of categories comprising a productive category and a non-productive category, wherein classifying the plurality of distractions comprises:

receiving a productivity training data set comprising data correlating distractions to productivity classifications;

training a productivity classifier using the productivity training data set; and outputting, using the distraction classifier, a productivity classification; and generate a path for the user based on the classified plurality of distractions and the user interest, wherein the path identifies a user engagement target.

2. The apparatus of claim 1, wherein the user interest identifies a purpose.

3. The apparatus of claim 2, wherein the user data comprises a plurality of obligations related to the purpose of the user.

4. The apparatus of claim 1, wherein tracking the user interest comprises receiving system logs from a user device.

5. The apparatus of claim 1, wherein tracking the user interest comprises utilizing a mouse tracking method to track a movement of a cursor on user device.

6. The apparatus of claim 1, wherein determining the interest level of the user further comprises determining an idle time of a user on a platform.

7. The apparatus of claim 1, wherein generating the path for the user comprises:

generating a plurality of paths;

generating a utility score based on a usefulness for each path of the plurality of paths; and ranking the plurality of paths based on the utility score.

8. The apparatus of claim 7, wherein generating the utility score comprises:

receiving a utility training data set comprising data correlating a plurality of paths to a plurality of utility scores;

training a utility classifier using the utility training data set; and outputting, using the utility classifier, the utility score.

9. The apparatus of claim 1, wherein generating a path further comprises using a web crawler to populate a system database with a plurality of paths based on a productive distraction.

10. A method for generating a path containing a user engagement target, the method comprising:

receiving, by a computing device, user data identifying a purpose of the user;

tracking, by the computing device, a user interest over a plurality of platforms, wherein tracking the user interest comprises determining an interest level of a user on a platform of the plurality of platforms, wherein the interest level comprises an assessment score compared to an interest threshold using an inference engine;

identifying, by the computing device, a plurality of distractions based on the user interest;

classifying, by the computing device, the plurality of distractions to a plurality of categories comprising a productive category and a non-productive category, wherein classifying the plurality of distractions comprises:

receiving a productivity training data set comprising data correlating distractions to productivity classifications;

training a productivity classifier using the productivity training data set; and outputting, using the distraction classifier, a productivity classification; and generating by the computing device, a path for the user based on the classified plurality of distractions and the user interest, wherein the path identifies a user engagement target.

11. The method of claim 10, wherein the user interest identifies a purpose.

12. The method of claim 11, wherein the user data comprises a plurality of obligations related to the purpose of the user.

13. The method of claim 10, wherein tracking the user interest comprises receiving system logs from a user device.

14. The method of claim 10, wherein tracking the user interest comprises utilizing a mouse tracking method to track a movement of a cursor on user device.

15. The method of claim 10, wherein determining the interest level of the user further comprises determining an idle time of a user on a platform.

16. The method of claim 10, wherein generating the path for the user comprises:

generating a plurality of paths;

generating a utility score based on usefulness for each path of the plurality of paths; and ranking the plurality of paths based on the utility score.

17. The method of claim 16, wherein generating the utility score comprises:

receiving a utility training data set comprising data correlating a plurality of paths to a plurality of utility scores;

training a utility classifier using the utility training data set; and outputting, using the utility classifier, the utility score.

18. The method of claim 10, wherein generating a path further comprises using a web crawler to populate a system database with a plurality of paths based on a productive distraction.

* * * * *